(12) United States Patent
Guido et al.

(10) Patent No.: US 7,487,443 B2
(45) Date of Patent: Feb. 3, 2009

(54) PORTAL PAGE VIEW LAYOUT BASED ON WEIGHTS

(75) Inventors: Patrick R. Guido, Cary, NC (US); Steven P. Kim, Raleigh, NC (US); Robert C. Leah, Cary, NC (US); Paul F. McMahan, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 604 days.

(21) Appl. No.: 10/836,792

(22) Filed: Apr. 30, 2004

(65) Prior Publication Data

US 2005/0246632 A1    Nov. 3, 2005

(51) Int. Cl.
*G06F 17/00* (2006.01)
*G06F 3/048* (2006.01)

(52) U.S. Cl. .................... 715/246; 715/243; 715/799
(58) Field of Classification Search ................ 715/517, 715/520, 760, 799, 703, 240, 241, 243, 246, 715/247, 251; 717/109
See application file for complete search history.

(56) References Cited

U.S. PATENT DOCUMENTS

| | | | | |
|---|---|---|---|---|
| 5,381,523 | A * | 1/1995 | Hayashi | 715/513 |
| 5,633,996 | A * | 5/1997 | Hayashi et al. | 715/246 |
| 5,739,821 | A * | 4/1998 | Ho et al. | 715/807 |
| 5,832,494 | A * | 11/1998 | Egger et al. | 707/102 |
| 5,838,317 | A * | 11/1998 | Bolnick et al. | 715/764 |
| 5,848,184 | A * | 12/1998 | Taylor et al. | 382/173 |
| 5,926,825 | A * | 7/1999 | Shirakawa | 715/273 |
| 6,415,306 | B2 | 7/2002 | Seaman | |
| 6,601,057 | B1 * | 7/2003 | Underwood et al. | 707/1 |
| 6,707,476 | B1 * | 3/2004 | Hochstedler | 715/789 |
| 6,766,362 | B1 * | 7/2004 | Miyasaka et al. | 709/219 |
| 6,785,671 | B1 * | 8/2004 | Bailey et al. | 707/3 |
| 7,062,511 | B1 * | 6/2006 | Poulsen | 707/104.1 |
| 7,093,196 | B1 * | 8/2006 | Griffiths et al. | 715/246 |
| 2001/0034740 | A1 * | 10/2001 | Kerne | 707/500.1 |
| 2001/0042084 | A1 | 11/2001 | Seaman | |
| 2001/0043235 | A1 * | 11/2001 | Best et al. | 345/781 |
| 2002/0012010 | A1 * | 1/2002 | Pasquali | 345/719 |
| 2002/0049725 | A1 * | 4/2002 | Nakade | 707/1 |
| 2002/0055959 | A1 * | 5/2002 | Hayashi | 707/517 |
| 2002/0152245 | A1 * | 10/2002 | McCaskey et al. | 707/530 |
| 2002/0180800 | A1 * | 12/2002 | Taylor et al. | 345/788 |
| 2003/0023742 | A1 * | 1/2003 | Allen et al. | 709/231 |
| 2003/0110448 | A1 | 6/2003 | Haut et al. | |
| 2003/0137538 | A1 | 7/2003 | Hesmer et al. | |
| 2003/0149938 | A1 * | 8/2003 | McElfresh et al. | 715/517 |
| 2003/0167315 | A1 | 9/2003 | Chowdhry et al. | |
| 2004/0003096 | A1 | 1/2004 | Willis et al. | |
| 2004/0003097 | A1 | 1/2004 | Willis et al. | |

(Continued)

*Primary Examiner*—Stephen Hong
*Assistant Examiner*—William Wong
(74) *Attorney, Agent, or Firm*—Marcia L. Doubet; David R. Irvin

(57) ABSTRACT

Techniques are disclosed for controlling where dynamically-added content will be positioned within the layout of a content aggregation view (e.g., for controlling where content that is created by a portlet will be rendered within a portal page). In preferred embodiments, weighting values are assigned to the portlet, and these values are used to determine the portlet's relative placement. The values may be assigned at development time, at deployment time, and/or at run time. Using disclosed techniques, content placement is more predictable and consistent, and related content can be grouped together when rendered even though that content is not simultaneously rendered.

11 Claims, 2 Drawing Sheets

U.S. PATENT DOCUMENTS

| | | |
|---|---|---|
| 2004/0017395 A1 | 1/2004 | Cook |
| 2004/0044964 A1* | 3/2004 | Martens et al. .............. 715/517 |
| 2004/0100502 A1* | 5/2004 | Ren ........................... 345/802 |
| 2004/0123238 A1* | 6/2004 | Hefetz et al. ................. 715/513 |
| 2004/0133469 A1* | 7/2004 | Chang ........................ 705/14 |
| 2004/0163047 A1* | 8/2004 | Nagahara et al. ............ 715/517 |
| 2004/0183831 A1* | 9/2004 | Ritchy et al. ................. 345/762 |
| 2004/0221308 A1* | 11/2004 | Cuttner et al. ................ 725/46 |
| 2004/0225961 A1* | 11/2004 | Ohashi et al. ................ 715/517 |
| 2004/0225967 A1* | 11/2004 | Hassanin et al. ............. 715/760 |
| 2004/0255245 A1* | 12/2004 | Yamada et al. ............... 715/517 |
| 2006/0150088 A1* | 7/2006 | Kraft et al. ................... 715/517 |
| 2006/0150092 A1* | 7/2006 | Atkins ........................ 715/517 |

* cited by examiner

| | Vertical Weight | Horizontal Weight | | Vertical Weight | Horizontal Weight |
|---|---|---|---|---|---|
| | 0.5 | 0.5 | | | |

PORTAL PAGE VIEW LAYOUT BASED ON WEIGHTS

BACKGROUND OF THE INVENTION

1. Field of the Invention

The present invention relates to computer software, and deals more particularly with techniques for controlling where dynamically-added content will be positioned within the layout of a content aggregation view (e.g., for controlling where content that is created by a portlet will be rendered within a portal page).

2. Description of the Related Art

Web portals (sometimes referred to equivalently as portal platforms, portal systems, or portal servers) are designed to serve as a gateway, or focal point, for access to an aggregation or collection of information, applications, and/or network-available services from many different sources. Portals often provide an end user view, which is commonly referred to as a "portal page". A portal page is often structured as a single overview-style page which may provide links for the user to navigate to more detailed information. Alternatively, portal pages may be designed using a notebook paradigm whereby multiple pages are available to the user upon selecting a tab for that page.

Other frameworks which aggregate content and/or services may have characteristics analogous to those of a portal platform. Accordingly, the terms "portal" and "content aggregation framework" are used interchangeably herein. Furthermore, the terms "portlet" and "content-creating component" are used interchangeably herein to refer to the components that create the content to be rendered.

While developments for portals and content aggregation frameworks have made great progress in recent years, areas remain where improvements can be made.

SUMMARY OF THE INVENTION

An object of the present invention is to provide improvements for portals and/or other content aggregation frameworks.

Another object of the present invention is to provide techniques for controlling where dynamically-added content will be positioned within the layout of a content aggregation view.

A further object of the present invention is to define techniques for controlling where content that is created by a portlet will be rendered within a portal page.

Yet another object of the present invention is to define techniques that enable content rendered in a portal page to be positioned in a consistent manner.

Still another object of the present invention is to define techniques that enable content created by one portlet to be positioned relatively near related content that is created by another portlet.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention may be provided as methods for controlling where content created by each of a plurality of content-producing portals will be rendered within a portal page, comprising: assigning a horizontal weight and a vertical weight to each of the plurality of content-producing portlets, such that all content produced by each one of the portlets is then automatically rendered within the portal page according to the assigned horizontal and vertical weight for that portlet; for each of at least two of the portlets that are dynamically selected for adding to the portal to display on a display device, using the assigned weights to dynamically determine a relative positioning within the portal page for the dynamically-selected portlet (which preferably comprises: comparing, for each subsequently-selected one of the portlets that is selected after an initially-selected one of the portlets is positioned at an initial position, the horizontal weight and the vertical weight assigned to the subsequently-selected portlet to the horizontal weight and the vertical weight assigned to each of the portlets previously selected for adding to the portal page; positioning the subsequently-selected portlet in a higher vertical position on the portal page than each of the previously-selected portlets for which the comparing determines that the subsequently-selected one has a higher vertical weight; and positioning the subsequently-selected portlet in a left-ward horizontal position from, and at a same vertical position with, each of the previously-selected portlets for which the comparing determines that the subsequently-selected one has an identical vertical weight and a higher horizontal weight); programmatically changing, by a selected one of the portlets previously selected for adding to the portal page, the assigned vertical weight of that portlet to a different vertical weight upon occurrence of a state change of that portlet; and repeating the using the assigned weights to dynamically determine a relative positioning within the portal page, for each of the portlets previously selected for adding to the portal page, upon a refresh of the portal page on the display device, such that the programmatically-assigned different vertical weight of the selected one is used when dynamically determining the relative positioning of the selected one, thereby positioning the selected one in a different vertical position on the portal page as compared to a previous vertical position occupied by the selected one prior to the refresh.

The present invention will now be described with reference to the following drawings, in which like reference numbers denote the same element throughout.

DESCRIPTION OF PREFERRED EMBODIMENTS

Figure 1:
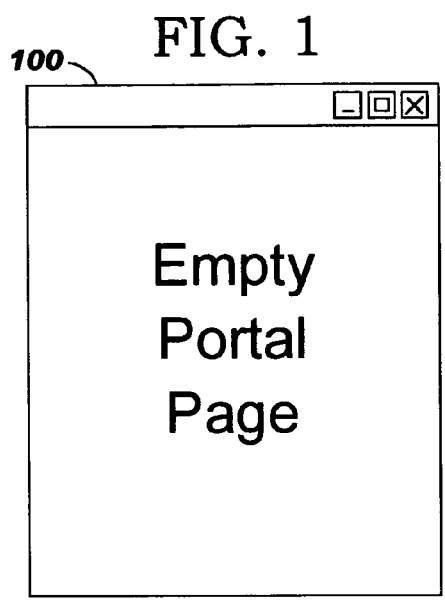
FIG. 1 illustrates an empty portal page and several sample portlets that are configured for rendering their content in that page.

The present invention discloses techniques that improve user interactions with content aggregation frameworks. In particular, techniques are disclosed herein for controlling where dynamically-added content, such as content created by portlets, will be positioned within the layout of a content aggregation view such as a portal page. Preferred embodiments assign content-placement values to portlets, and these values are programmatically inspected when a portlet is added to a page; these content-placement values then determine the relative placement among the various portlets, as will be described in more detail below.

Drawbacks of Prior Art Content Placement Techniques will now be Described.

When a portal page is structured as an overview-style page, prior art content placement techniques often add portlet content arbitrarily to the end of an existing page. This can create scrolling problems for the portal user. For example, suppose the user is viewing content rendered near the top of the portal page at a time when portlet content is added to the bottom of the page. Responsive to addition of the new content, focus within the portal page is typically given to the new content. If the entire portal page can no longer fit within the viewable area of the display, the content that was being viewed will be scrolled off the top of the page to enable viewing the content having the current focus. This prior art approach is very undesirable behavior, as it may be quite confusing and/or irritating for users.

Furthermore, this prior art approach to content placement can result in related portlet content being visually separated, which may hinder a user's ability to fully perceive that content.

In addition, when users select a collection of portlets to comprise a portal page using prior art techniques, they must explicitly define the page layout. This is often tedious manual work and leads to inconsistency between different users' views of the same underlying portal page content. Portal pages that have an inconsistent portlet layout are difficult to share between multiple users. They are also more costly for content development organizations to debug and support.

Preferred embodiments address these and other limitations through use of values that are used in portlet placement decisions. A portlet developer preferably assigns two content-placement values, which are referred to equivalently herein as weights or weighting values, to a portlet at design time. In addition or instead, embodiments of the present invention may enable assigning (or re-assigning) these values at deployment time, for example by a systems administrator, and/or at run time. Run-time weight assignments include assignments made by (or re-assigned by) end users as well as programmatic value assignments (e.g., whereby an already-displayed, currently-executing portlet may influence its own weights for a subsequent rendering of the page).

The weighting values assigned to a portlet may be associated therewith in a number of ways. Examples include, by way of illustration: (1) specifying the values as attributes of the portlet's content when rendering that content in a markup language; and (2) recording the values in a data store of some type, in association with an identifier of the portlet.

Preferred embodiments are described herein with reference to weighting values that range between zero and one, although other value ranges may be substituted without deviating from the scope of the present invention, and use a pair of weighting values that corresponds to a vertical weight and a horizontal weight. As portlets are dynamically added to a portal page, their position is influenced by this pair of values.

In preferred embodiments, a locale-specific decision is made as to how the weighting values influence the layout. Assuming a US-English locale, for example, a portlet with a high vertical weighting value is preferably positioned closer to the upper region, or top, of the portal page and a portlet with a high horizontal weighting value is preferably positioned closer to the left of the portal page. In another locale, a placement algorithm may enforce other preferences. In alternative embodiments, administrators or configuration parameters may assign values in a manner that achieves a desired locale-specific result even though a single, locale-independent algorithm is employed. By way of illustration but not of limitation, subsequent discussions are in terms of a US-English locale.

Preferably, portlets having an identical vertical weight are positioned in the same row and their horizontal weights determine their order from left to right. Using this approach, portlets with higher priorities (such as one showing important information) can be automatically positioned near the top of the page. Portlets that are logically related can be automatically grouped as they are added to the portal page (e.g., by assigning the same vertical weight to each of the related portlets).

Figure 2:
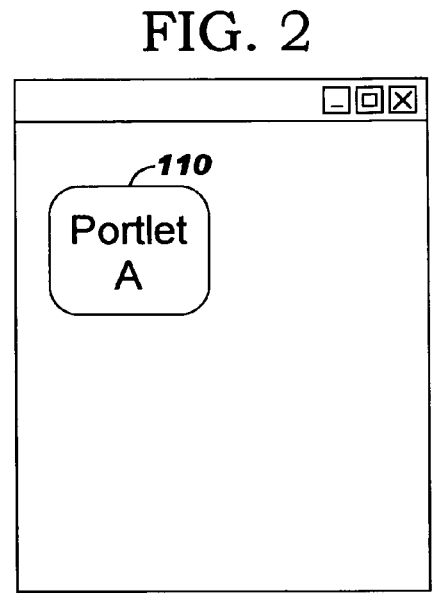
FIGS. 2-4 show how each portlet's weighting values are used to determine that portlet's relative placement on the portal page.
Figure 2:
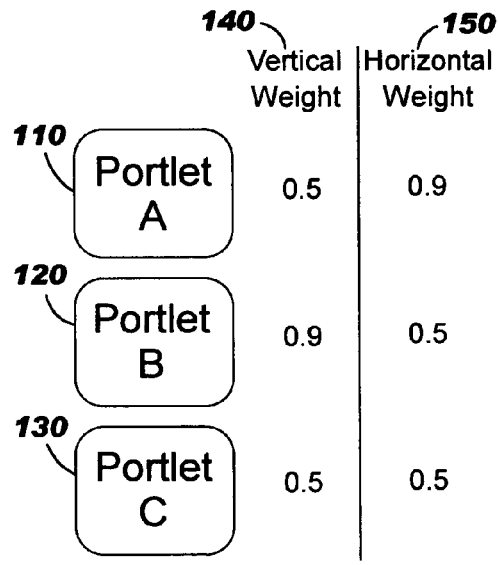
Figure 2:
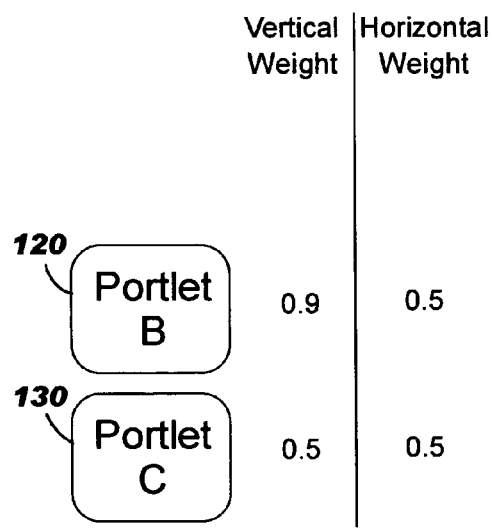

FIGS. 1-4 illustrate a sample portal page into which portlet content is positioned using techniques disclosed herein. FIG. 1 shows an empty portal page 100 and three sample portlets 110, 120, 130 that are configured for this portal page 100 but which have not yet been added thereto. Sample vertical and horizontal weighting values for each sample portlet are shown in columns 140, 150. Suppose portlet 110 is the first portlet added to portal page 100 at run time. As shown in FIG. 2, portlet 110 is preferably positioned (by default) near the top left corner of the page.

Figure 3:
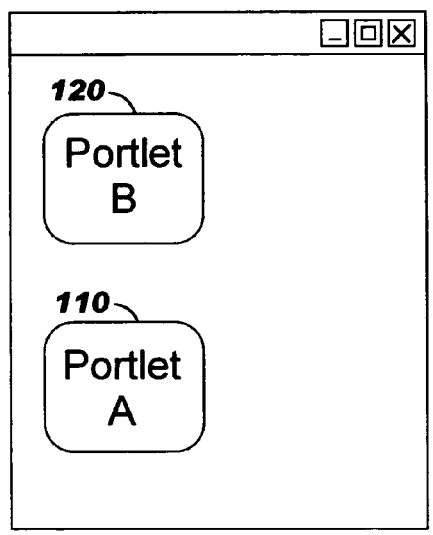

Further suppose that portlet 120 is the next portlet added to portal page 100. The weighting values of portlets 110, 120 are therefore compared to determine where portlet 120 should be placed relative to portlet 110. Preferred embodiments favor a higher vertical weighting value over a higher horizontal weighting value. Therefore, as illustrated in FIG. 3, portlet 120 will be positioned closer to the top left corner of the page than portlet 110 because the vertical weight associated with portlet 120 is higher than the vertical weight of portlet 110 (where the vertical weights are 0.9 and 0.5 for portlets 120 and 110, in this example).

Figure 4:
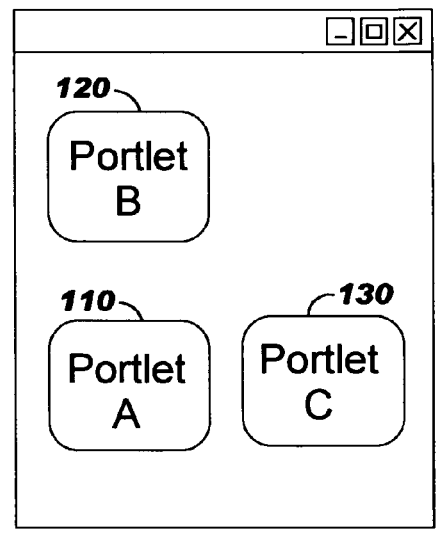

When the final portlet 130 is added to the portal page, as shown in FIG. 4, preferred embodiments position this portlet lower on the page than portlet 120, since portlet 130 has a lower vertical weight than portlet 120, and further to the right than portlet 110, since portlet 130 has a lower horizontal weight than portlet 110. And, since the vertical weights are identical between portlets 110 and 130, these portlets are shown as being rendered in the same row.

In preferred embodiments, each time the portal server renders a portal page, it re-checks the portlet weights and makes any necessary adjustments to the layout. Portlets may therefore change location over time. In one aspect of preferred embodiments, an executing portlet may programmatically reposition itself based on run-time occurrences. For example, if a portlet detects an important state change, it may set its vertical weight to a higher value so that it will be positioned nearer the top of the page when the page is next rendered by the portal server. Similarly, a portlet might set its vertical weight to a lower value, and/or change its horizontal weight value, in application-specific circumstances.

While preferred embodiments place portlets having an identical vertical weight in the same row, alternative embodiments may fill a row from left-to-right based on successively-lower vertical weights, even though those weights are not identical, without deviating from the scope of the present invention.

Using the teachings herein, it will be obvious to one of ordinary skill in the art how content placement algorithms can be written to compare the location of a portal page's already-placed portlets with the weights of a portlet that is to be positioned (or re-positioned) within that portal page.

Alternative embodiments may use a different number of values to determine a portlet's relative placement within a page. For example, a single "importance" value might be associated with portlets, where each of these importance values has a relative ranking that is used to determine vertical placement. In this approach, the content of highest importance is preferably rendered closer to the top of the page than content of lesser importance, similar to the examples which have been discussed. Or, several different placement values might be used in combination to determine a portlet's relative weights as compared to other portlets. As another alternative, preference might be given to keeping content nearer the left-hand side of the viewable area (e.g., so that the user is more likely to notice that content when scanning the page).

As has been demonstrated, the present invention provides advantageous techniques that enable controlling where portlets will be positioned within the layout of a portal page. Benefits of this approach include more predictable and consistent content layouts, and an ability to group related portlets physically near one another when rendered (even though the portlets are not necessarily rendered near, in terms of time, to one another).

As will be appreciated by one of skill in the art, embodiments of the present invention may be provided as methods, systems, or computer program products comprising computer-readable program code. Accordingly, the present invention may take the form of an entirely hardware embodiment, an entirely software embodiment, or an embodiment combining software and hardware aspects. The computer program products maybe embodied on one or more computer-usable storage media (including, but not limited to, disk storage, CD-ROM, optical storage, and so forth) having computer-readable program code embodied therein.

When implemented by computer-readable program code, the instructions contained therein may be provided to a processor of a general purpose computer, special purpose computer, embedded processor, or other programmable data processing apparatus to produce a machine, such that the instructions, which execute via the processor of the computer or other programmable data processing apparatus, create means for implementing preferred embodiments.

These computer-readable program code instructions may also be stored in a computer-readable memory that can direct a computer or other programmable data processing apparatus to function in a particular manner, such that the instructions stored in the computer-readable memory produce an article of manufacture including instruction means which implement preferred embodiments.

The computer-readable program code instructions may also be loaded onto a computer or other programmable data processing apparatus to cause a series of operational steps to be performed on the computer or other programmable apparatus to produce a computer-implemented method such that the instructions which execute on the computer or other programmable apparatus provide steps for implementing preferred embodiments.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention.

What is claimed is:

1. A method of controlling where content created by each of a plurality of content-producing portlets will be rendered within a portal page, comprising:

assigning a horizontal weight and a vertical weight to each of the plurality of content-producing portlets, such that all content produced by each one of the portlets is then automatically rendered within the portal page according to the assigned horizontal and vertical weight for that portlet;

for each of at least two of the portlets that are dynamically selected for adding to the portal page to display on a display device, using the assigned weights to dynamically determine a relative positioning within the portal page for the dynamically-selected portlet, comprising:

comparing, for each subsequently-selected one of the portlets that is selected after an initially-selected one of the portlets is positioned at an initial position, the horizontal weight and the vertical weight assigned to the subsequently-selected portlet to the horizontal weight and the vertical weight assigned to each of the portlets previously selected for adding to the portal page;

positioning the subsequently-selected portlet in a higher vertical position on the portal page than each of the previously-selected portlets for which the comparing determines that the subsequently-selected one has a higher vertical weight; and positioning the subsequently-selected portlet in a leftward horizontal position from, and at a same vertical position with, each of the previously-selected portlets for which the comparing determines that the subsequently-selected one has an identical vertical weight and a higher horizontal weight;

programmatically changing, by a selected one of the portlets previously selected for adding to the portal page, the assigned vertical weight of that portlet to a different vertical weight upon occurrence of a state change of that portlet; and repeating the using the assigned weights to dynamically determine a relative positioning within the portal page, for each of the portlets previously selected for adding to the portal page, upon a refresh of the portal page on the display device, such that the programmatically-assigned different vertical weight of the selected one is used when dynamically determining the relative positioning of the selected one, thereby positioning the selected one in a different vertical position on the portal page as compared to a previous vertical position occupied by the selected one prior to the refresh.

2. The method according to claim 1, wherein the assigned horizontal weight and the assigned vertical weight are assigned at development time of at least one of the content-producing portlets.

3. The method according to claim 1, wherein the assigned horizontal weight and the assigned vertical weight are assigned at deployment time for at least one of the content-producing portlets.

4. The method according to claim 1, wherein the assigned horizontal weight and the assigned vertical weight are assigned at run time for at least one of the content-producing portlets.

5. The method according to claim 4, wherein the run-time assignment is made by a user of the portal page.

6. The method according to claim 4, wherein the run-time assignment is made by portlet execution.

7. The method according to claim 1, wherein the assigned horizontal weight and the assigned vertical weight for each portlet are specified as attribute values in markup language syntax specifying content to be rendered by that portlet.

8. The method according to claim 1, wherein the assigned horizontal weight and the assigned vertical weight for each portlet are associated with an identifier of the portlet in a data store.

9. The method according to claim 1, further comprising causing all content produced by related ones of the portlets to be grouped together when rendered within the portal page by assigning an identical vertical weight to each of the related ones of the portlets, thereby causing the positioning the subsequently-selected portlet in a left-ward horizontal position to position each of the at least two related ones at the same vertical position on the portal page, wherein the horizontal weight assigned to each of the related ones then determines the horizontal position for each of the related ones at the same vertical position.

10. The method according to claim 1, further comprising causing all content produced by related ones of the portlets to be grouped together when rendered within the portal page by assigning an identical vertical weight to each of the related ones of the portlets.

11. The method according to claim 1, further comprising:
dynamically changing at least one of the horizontal weight and the vertical weight assigned to at least one selected one of the portlets previously selected for adding to the portal page; and
repeating, upon a refresh of the portal page on the display device, the using of the assigned weights to dynamically determine the relative positioning within the portal page, for each of the portlets previously selected for adding to the portal page, wherein the relative positioning of at least one of the previously-selected portlets changes after the refresh, as compared to a previous vertical position occupied by that portlet on the portal page prior to the refresh, due to the dynamic change.

* * * * *